United States Patent
Klaser et al.

(10) Patent No.: US 10,024,370 B1
(45) Date of Patent: Jul. 17, 2018

(54) HYBRID TRANSMISSION HAVING ELECTRO-MAGNETICALLY ACTUATED PAWL CLUTCH

(71) Applicant: Ford Global Technologies, LLC, Dearborn, MI (US)

(72) Inventors: Jacob Klaser, Royal Oak, MI (US); Norman Jerry Bird, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/405,664

(22) Filed: Jan. 13, 2017

(51) Int. Cl.
 *F16D 27/118* (2006.01)
 *F16D 41/12* (2006.01)
 *B60K 6/365* (2007.10)
 *B60K 6/44* (2007.10)

(52) U.S. Cl.
 CPC ............ *F16D 27/118* (2013.01); *B60K 6/365* (2013.01); *B60K 6/44* (2013.01); *F16D 41/12* (2013.01); *B60Y 2200/92* (2013.01); *B60Y 2400/427* (2013.01); *Y10S 903/91* (2013.01)

(58) Field of Classification Search
 None
 See application file for complete search history.

(56) References Cited

U.S. PATENT DOCUMENTS

| | | |
|---|---|---|
| 1,900,787 A | 3/1933 | Baugnee |
| 2,866,109 A | 12/1958 | Watson |
| 3,463,280 A | 8/1969 | Hoffman et al. |
| 5,931,271 A | 8/1999 | Haka |
| 5,996,758 A | 12/1999 | Baxter, Jr. |
| 6,121,705 A | 9/2000 | Hoong |
| 6,244,965 B1 | 6/2001 | Klecker et al. |
| 6,854,577 B2 | 2/2005 | Ruth |
| 7,258,214 B2 | 8/2007 | Pawley et al. |
| 7,484,605 B2 | 2/2009 | Pawley et al. |
| 8,403,123 B2 | 3/2013 | Bird et al. |
| 8,978,838 B2 | 3/2015 | Bird |
| 9,091,312 B2 | 7/2015 | Lindemann et al. |
| 9,097,299 B2 * | 8/2015 | Sharp ................ F16D 41/16 |
| 9,127,730 B2 | 9/2015 | Greene et al. |
| 2009/0152028 A1 | 6/2009 | Samie et al. |
| 2011/0290608 A1 * | 12/2011 | Bird .................... F16D 27/004 192/45.1 |
| 2012/0122622 A1 * | 5/2012 | Turnbull ................ B60K 6/365 475/5 |
| 2016/0091062 A1 | 3/2016 | Wys et al. |
| 2016/0160941 A1 | 6/2016 | Green et al. |

* cited by examiner

*Primary Examiner* — Justin Holmes
(74) *Attorney, Agent, or Firm* — David B. Kelley; Brooks Kushman P.C.

(57) ABSTRACT

An electro-magnetically actuated pawl clutch is adapted to establish a fixed overdrive ratio in a powersplit type hybrid gearing arrangement. The electro-magnetically actuated clutch includes an inner race splined to the transmission input shaft and an outer race fixed to a first gear that is supported for rotation about the input shaft. The inner race includes two magnetically separated toothed rings. Electrical current in a non-rotating coil establishes a magnetic field in the inner race. The magnetic field causes a set of pawls to pivot with respect to the outer race and to engage at least one of the toothed rings. The pawls and teeth are designed such that, when engaged, the outer race can rotate faster than the inner race but cannot rotate slower. The first gear meshes with a second gear fixed to the transmission output shaft.

15 Claims, 7 Drawing Sheets

HYBRID TRANSMISSION HAVING ELECTRO-MAGNETICALLY ACTUATED PAWL CLUTCH

TECHNICAL FIELD

This disclosure relates to the field of vehicle clutches. More particularly, the disclosure pertains to an electro-magnetically actuated pawl clutch used within a hybrid electric powertrain.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Some transmissions, called discrete ratio transmissions, are configured to establish a finite number of speed ratios between an input shaft and an output shaft. When the currently selected ratio is no longer appropriate, a discrete ratio transmission must shift to a different one of the available speed ratios. Other transmissions, called continuously variable transmissions (CVTs), are capable of establishing any speed ratio between lower and upper limits. CVTs are capable of making frequent fine speed ratio adjustments which are not perceivable by vehicle occupants.

Many transmissions use hydraulically actuated friction clutches to establish various power flow paths. Hydraulic actuation is suited for clutches that selectively couple rotating elements to one another because pressurized hydraulic fluid can be routed from a stationary housing to rotating components between seals. Therefore, the hydraulic actuator can rotate with one of the rotating elements. When there are multiple hydraulically actuated clutches, the clutches often share an engine drive pump and share many of the valve body components used to regulate the pressure.

Hybrid vehicle transmissions improve fuel economy by providing energy storage. In a hybrid electric vehicle, for example, energy may be stored in a battery. The battery may be charged by operating the engine to produce more power than instantaneously required for propulsion. Additionally, energy that would otherwise be dissipated during braking can be captured and stored in the battery. The stored energy may be used later, allowing the engine to produce less power than instantaneously required for propulsion and thereby consuming less fuel.

SUMMARY OF THE DISCLOSURE

An electro-magnetically actuated clutch includes a non-rotating electromagnet coil, a toothed inner race, an outer race, and a magnetically conductive pawl. The toothed inner race, which is supported for rotation about the coil, has left and right magnetically conductive rings which are magnetically separated from one another. The outer race, which may be magnetically non-conductive, is supported for rotation about the inner race. The pawl is supported for rotation with the outer race and is pivotable into engagement with the left and right rings in response to current in the coil. Both rings may have teeth. The teeth of one of the rings may be offset from the teeth of the other ring such that a majority of the engagement force is distributed to one ring.

A clutch includes an electromagnetic coil, left and right magnetically conductive rings, a race supported for rotation with respect to the rings, and a magnetically conductive pawl. The electromagnetic coil may be non-rotating while the rings and the race are supported for rotation. The left and right rings each have a cylindrical surface adjacent to the coil and a toothed surface opposing the cylindrical surface. The electromagnetic coil may be radially inside the rings. The left and right rings are magnetically separated from each other but may be fixedly coupled to one another. The race is supported for rotation with respect to the rings and may be radially outside the rings. The pawl is pivotable with respect to the race into engagement with the left and right rings in response to current in the coil.

A transmission includes an electromagnetic coil, left and right magnetically conductive rings, an outer race, and a magnetically conductive pawl. The coil may be fixed to a transmission case. The rings are both fixedly coupled to an input shaft and are magnetically separated from one another. The outer race is supported for rotation with respect to the input shaft. The pawl is supported for rotation with the outer race and is pivotable into engagement with the left and right rings in response to current in the coil.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. In contrast, two rotating elements are selectively coupled by a shift element when the shift element constrains them to rotate as a unit whenever it is fully engaged and they are free to rotate at distinct speeds in at least some other operating condition. Two rotating elements are coupled if they are either fixedly coupled or selectively coupled. Two rotating elements are driveably connected if a series of gears and shafts is capable of transmitting power from one to the other and establishes a fixed speed ratio between the two elements.

Figure 1:
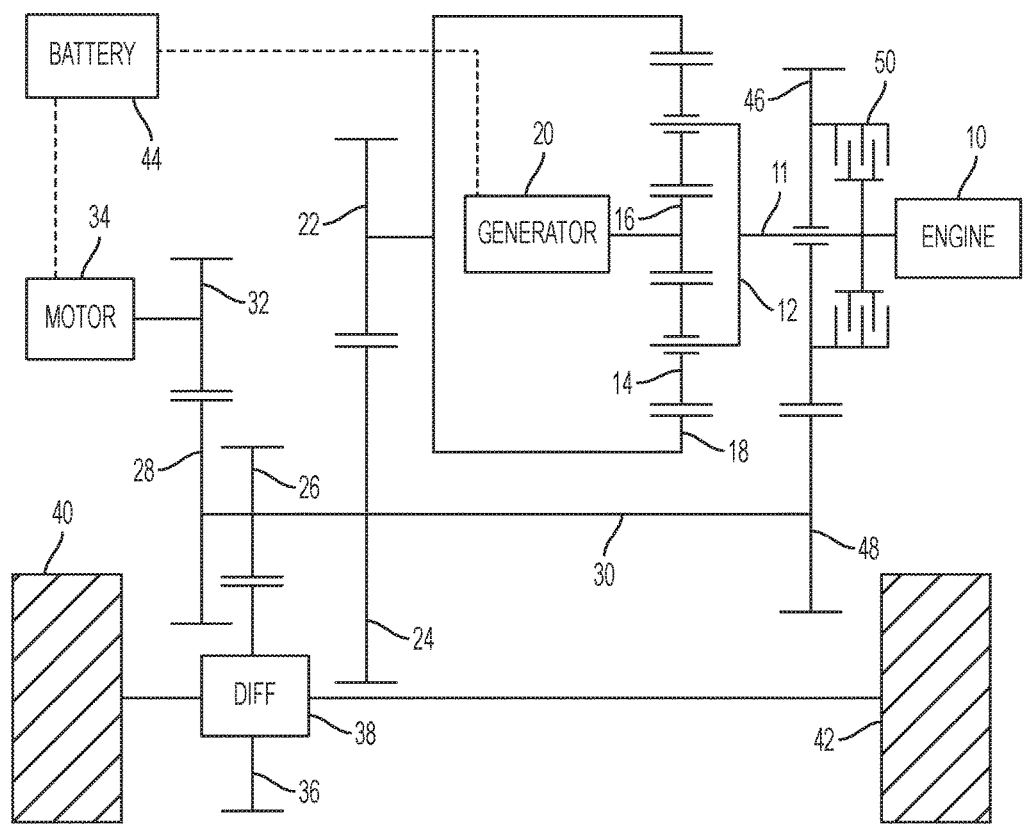
FIG. 1 is a schematic diagram of a gearing arrangement for a hybrid electric powertrain.

FIG. 1 schematically illustrates a kinematic arrangement for a power-split type hybrid electric vehicle. Power is provided by engine 10 which is fixedly coupled to planet carrier 12 via transmission input shaft 11. A set of planet gears 14 are supported for rotation with respect to carrier 12. Sun gear 16 and ring gear 18 are each supported for rotation about the same axis as carrier 12 and each mesh with the planet gears 14. Generator 20 is fixedly coupled to sun gear 16. Layshaft gear 22 is fixedly coupled to ring gear 18 and meshes with layshaft gear 24. Layshaft gear 24 is fixedly coupled to layshaft gears 26 and 28 via shaft 30. Layshaft gear 32 meshes with layshaft gear 28 and is fixedly couple to motor 34. Layshaft gear 26 meshes with layshaft gear 36 which is the input to differential 38. Differential 38 drives wheels 40 and 42 allowing slight speed differences as the vehicle turns a corner.

Generator 20 and motor 34 are both reversible electric machines. The terms generator and motor are used merely as labels. Both machines are capable of converting electrical power to mechanical power or converting mechanical power to electrical power. For example, each machine may be a synchronous motor in combination with a three phase inverter. Both machines are electrically connected to battery 44. In some circumstances, engine 10 may generate more power than is delivered to the vehicle wheels 40 and 42 with the excess power stored in battery 44. In other circumstances, power may flow from battery 44 permitting engine 10 to produce less power than the instantaneous demand of the vehicle. For example, the engine 10 may be off while power to propel the vehicles comes from battery 44.

The powertrain of FIG. 1 can be operated in a continuously variable mode with battery 44 neither providing nor absorbing power. The torque applied to generator 20 and the torque applied to layshaft gear 22 are both related to the torque generated by engine 10 based on the number of teeth on sun gear 16 and the number of teeth on ring gear 18. Specifically, $$T_{gen} = \frac{N_{sun}}{N_{sun} + N_{ring}} T_{eng}$$

$$T_{gear22} = \frac{N_{ring}}{N_{sun} + N_{ring}} T_{eng}$$

where $T_{eng}$ is the torque generated by engine 10, $T_{gen}$ is the torque absorbed by the generator 20, $T_{gear22}$ is the torque absorbed by gear 22, $N_{sun}$ is the number of teeth on sun gear 16, and $N_{ring}$ is the number of teeth on ring gear 18. The engine speed is a weighted average of the generator speed and the speed of gear 22.

$$\omega_{eng} = \frac{N_{sun}}{N_{sun} + N_{ring}} \omega_{eng} + \frac{N_{ring}}{N_{sun} + N_{ring}} \omega_{gear22}$$

When the vehicle is moving slowly, gear 22 rotates slowly and generator 20 rotates faster than engine 10. Power generated by the engine is split by the planetary gear set. A portion of the power is transmitted mechanically to shaft 30 from carrier 12 to ring gear 18 to gear 22 to gear 24. The remaining power is transmitted from sun 16 to generator 20 which converts the power to electrical power. Motor 34 converts the electrical power to mechanical power which is transmitted to shaft 30 by gear 32 and 28. Although both power transfer paths are subject to some parasitic losses, conversions between electrical power and mechanical power typically involve more power loss than purely mechanical transfer. As the ratio of the speed of shaft 30 to the speed of engine 10 increases, a point is reached at which generator 10 is stationary. At this ratio, all of the power is transferred mechanically. At higher overdrive ratios, generator 20 rotates in the opposite direction as engine 10 and acts as a motor. Power circulates from generator 20 through the mechanical power flow path to shaft 30, through gears 28 and 32 to motor 34 which acts as a generator. The parasitic losses associated with the circulation of power tend to make operation at overdrive ratios inefficient.

The powertrain of FIG. 1 includes an additional power flow path to provide efficient power transfer at overdrive speed ratios. Specifically, layshaft gear 46 is supported for rotation about transmission input shaft 11. Layshaft gear 48 is fixedly coupled to shaft 30 and meshes with layshaft gear 46. Clutch 50 selectively couples layshaft gear 46 to shaft 11. When clutch 50 is engaged, power is transferred mechanically from engine 10 to shaft 30 via gears 46 and 48. In this fixed ratio mode of operation, battery 44 can provide additional power via either generator 20 or motor 34 or can be charged via either electrical machine. Use of the fixed ratio mode for steady state cruising significantly reduces fuel consumption because both the engine and the transmission operate efficiently.

Figure 2:
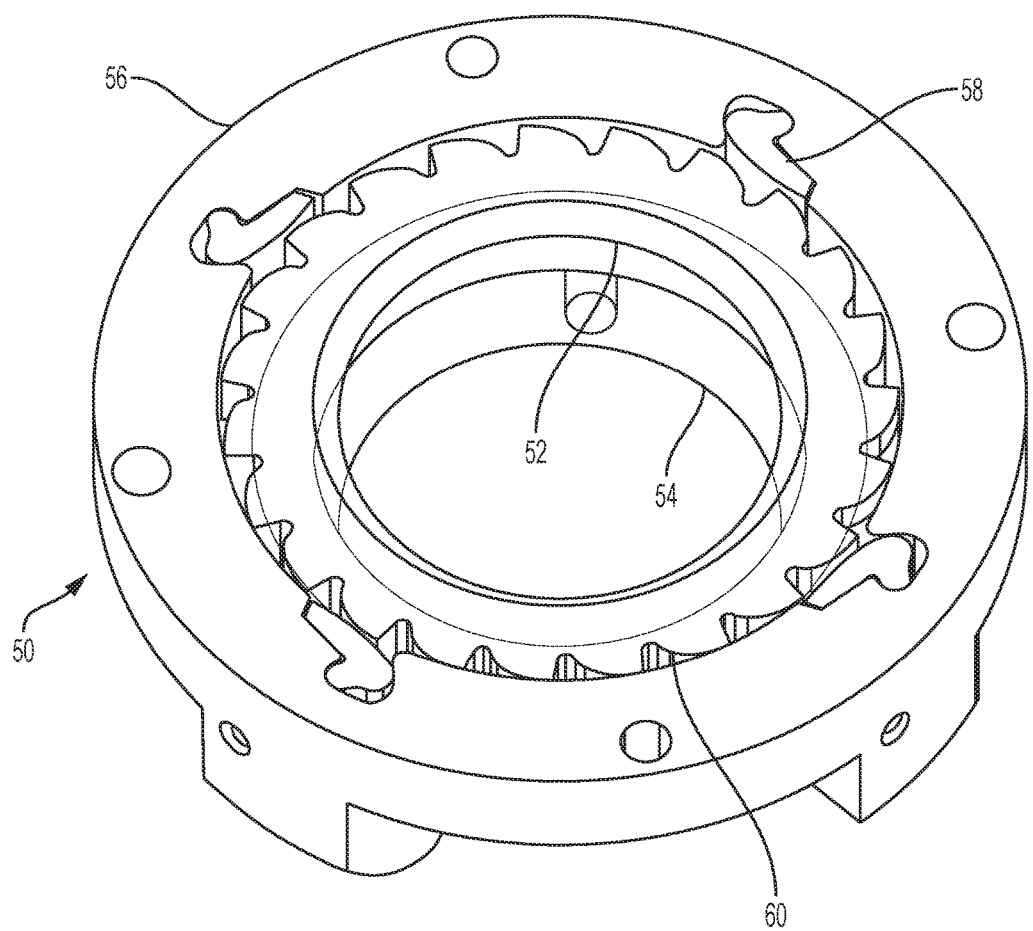
FIG. 2 is a pictorial view of an electro-magnetically actuated clutch suitable for use in the gearing arrangement of FIG. 1.
Figure 3:
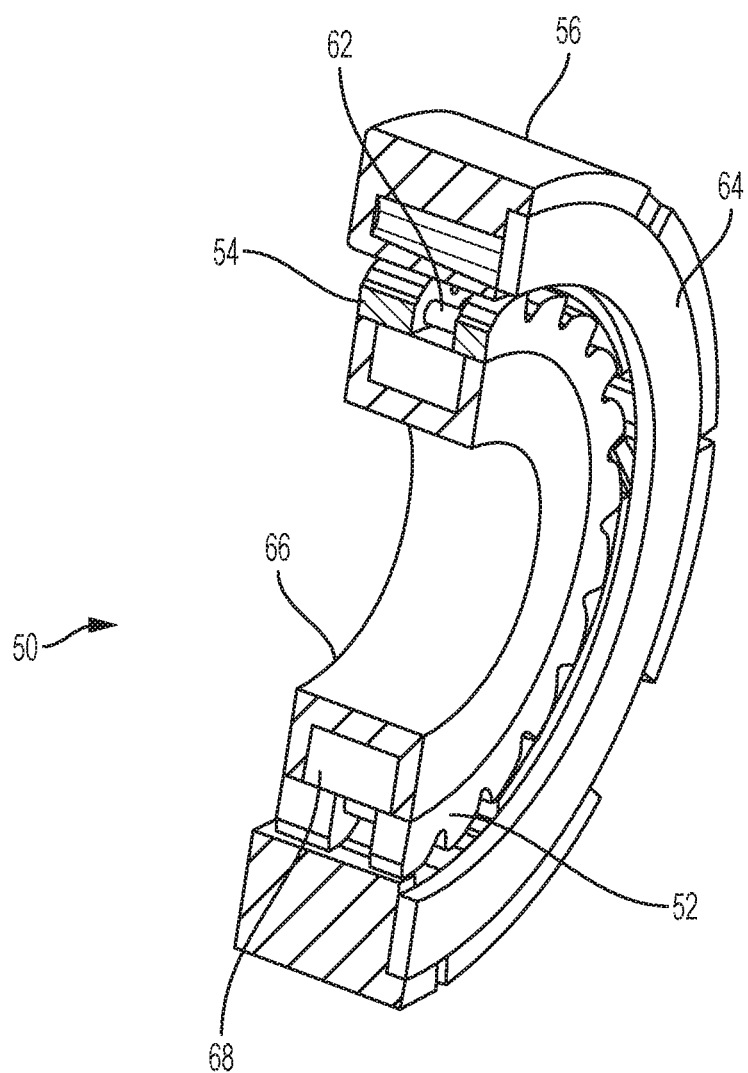
FIG. 3 is a cutaway view of the clutch of FIG. 2.
Figure 4:
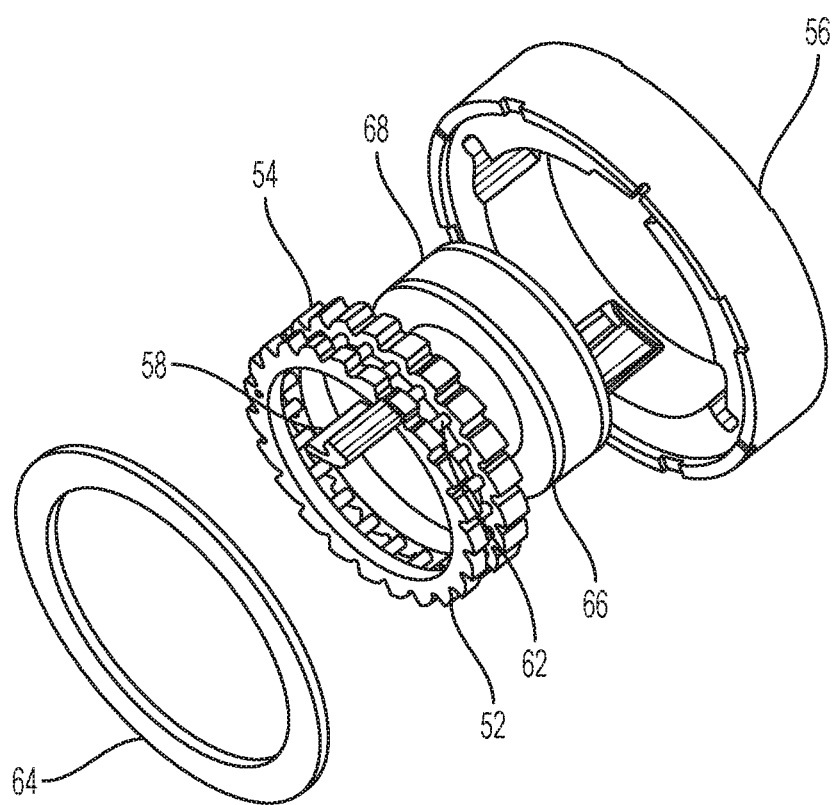
FIG. 4 is an exploded view of the clutch of FIG. 2.

Since clutch 50 is the only clutch in the powertrain of FIG. 1, use of a hydraulically actuated clutch would require addition of a pump and valve body. Therefore, a different method of actuating clutch 50 is desired. FIGS. 2 through 4 illustrate an electro-magnetically actuated pawl clutch suitable for selectively coupling gear 46 to shaft 11.

FIG. 2 is a pictorial view of an electromagnetic clutch suitable for use in the hybrid powertrain of FIG. 1. An inner race includes two rings 52 and 54. As applied to the hybrid powertrain of FIG. 1, each of these rings is fixedly coupled to input shaft 11. An outer race 54 is fixedly coupled to gear 46. A plurality of pawls 58 are retained in the outer race and rotate with the outer race. In the disengaged state illustrated in FIG. 2, the pawls are tucked into the outer race so as not to contact the inner race. In this state, relative rotation between the inner race and the outer race in either direction may occur. Springs may bias the pawls toward this disengaged position. The outer surfaces of the rings of the inner race have teeth 60. When the clutch is in an engaged state, the pawls 58 pivot into engagement with this these teeth. The tooth profile is ramped on one side such that relative rotation is permitted in one direction but not in the other. In the orientation shown in FIG. 2, when the inner race rotates clockwise relative to the outer race, the ramped profile of the teeth push the pawl back toward outer race. However, the teeth preclude counter-clockwise rotation of the inner race relative to the outer race. (A few degrees of rotation may occur before a pawl catches.)

FIG. 3 shows a cut-away pictorial view of clutch 50. The left and right inner race rings are joined by a plurality of posts 62. The pawls are retained axially in the outer race 56 by a retainer 64. An electro-magnetic coil is radially inside and concentric with the inner and outer races. The coil includes a magnetically conductive coil housing 66 having a U-shaped cross section. Electrical windings 68 are wrapped circumferentially in the gap of the coil housing. When the windings are energized with current, a magnetic field is established in the coil housing. One side of the U is axially aligned with the left inner race ring while the other side of the U is axially aligned with the right inner race ring. The radial clearances between the coil housing 66 and the left and right rings 54 and 52 are set as small as practical consistent with free rotation. Rings 52 and 54 are made of magnetically conductive material while the posts 62 separating them are made of magnetically non-conductive material. Thus, when the coil is energized, one ring becomes a magnetic North pole and the other ring becomes a magnetic South pole. The pawls are made of a magnetically conductive material such that they are attracted to the left and right rings when the coil is energized, engaging the clutch. Once the pawls come into contact with the left and right rings, they complete the magnetic circuit. With the magnetic circuit thus complete, other than the two small air gaps, little power is required to maintain the pawls in this state. FIG. 4 is an exploded view showing the assembly of clutch 50.

Figure 5:
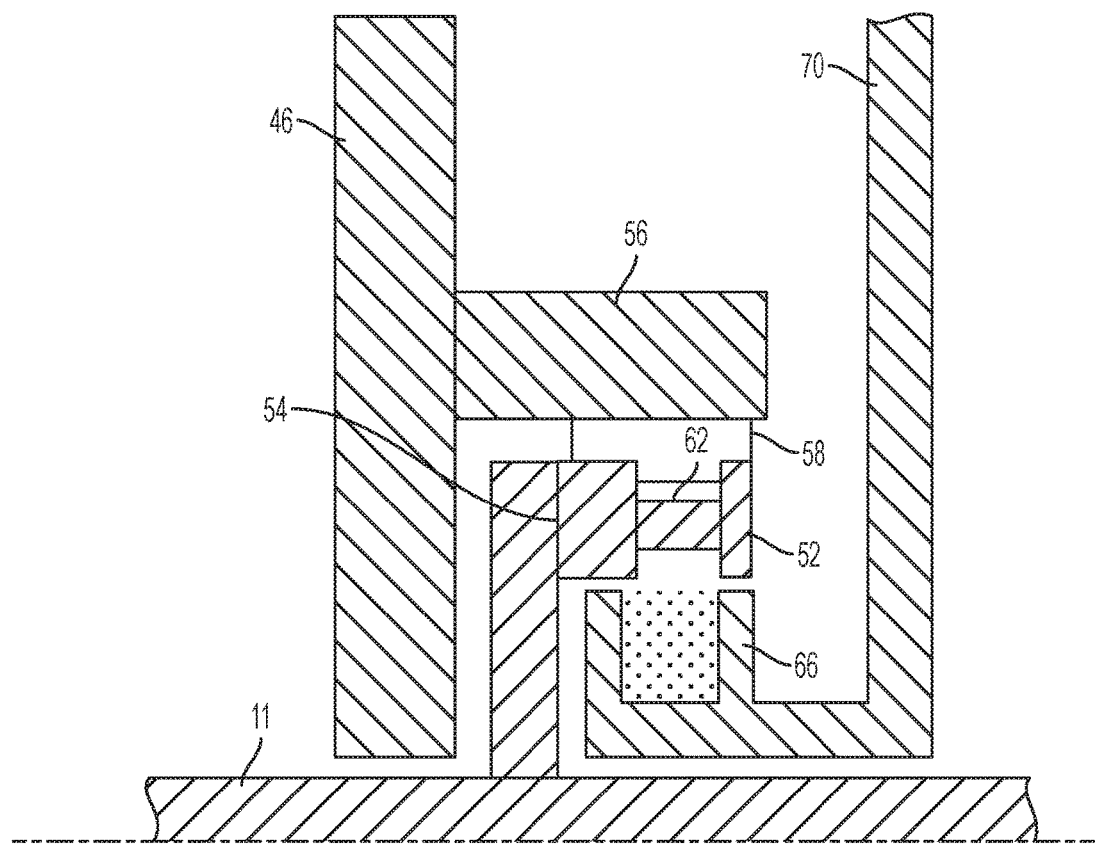
FIG. 5 is a cross section of the clutch of FIG. 2.
Figure 6:
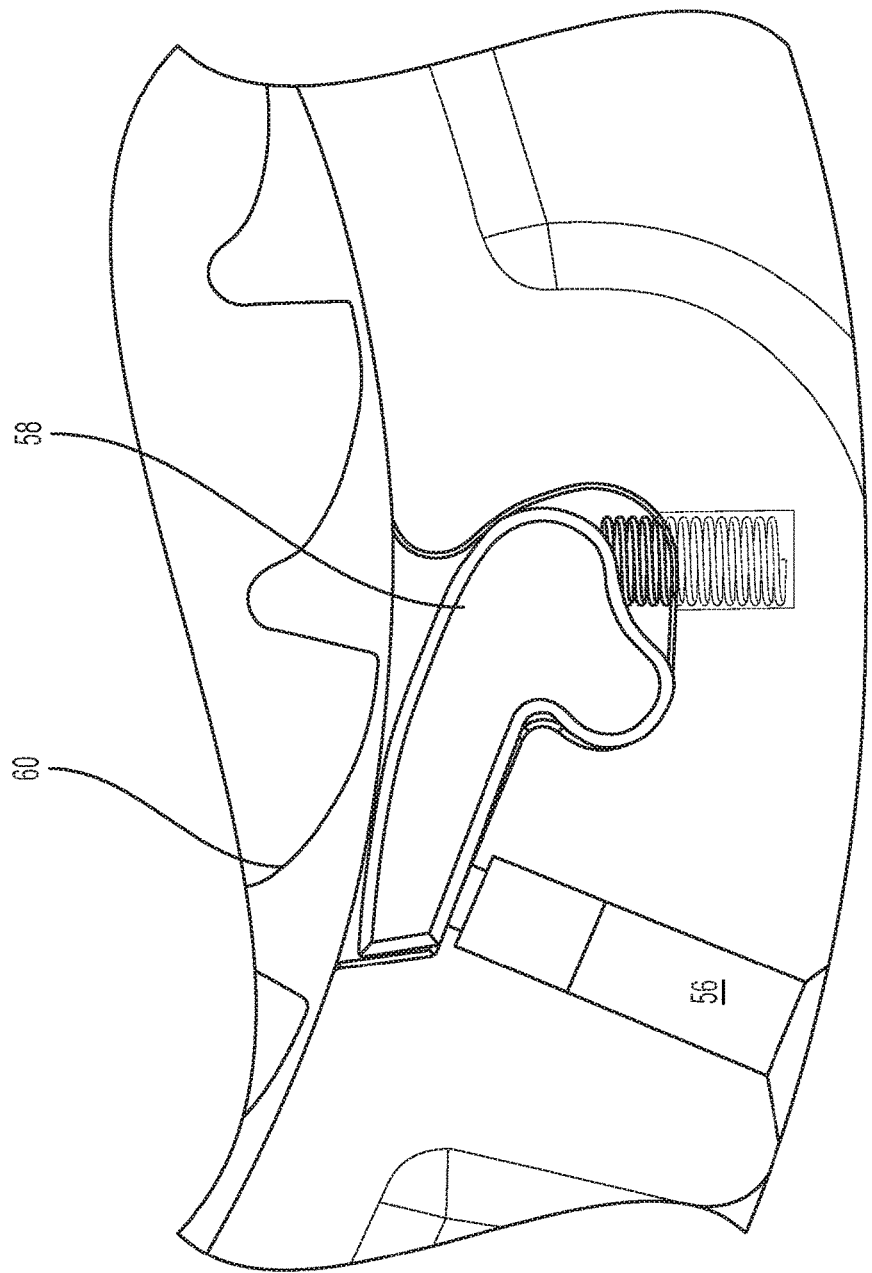
FIG. 6 is a detailed cross-sectional view of the clutch of FIG. 2 in a disengaged state.
Figure 7:
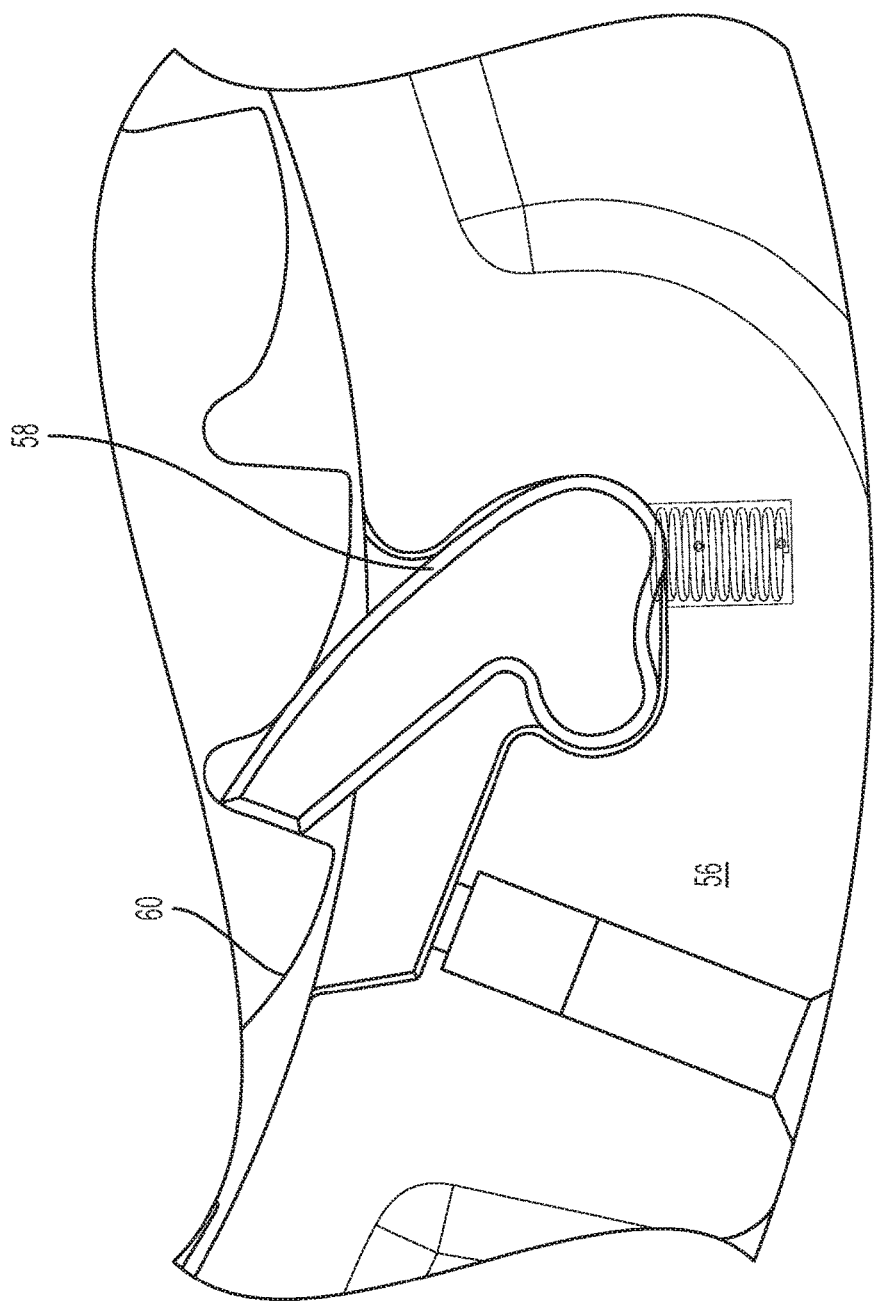
FIG. 7 is a detailed cross-sectional view of the clutch of FIG. 2 in an engaged state.

FIG. 5 is a cross section of the clutch as installed in the kinematic arrangement of FIG. 1. The coil 66 is fixedly coupled to a transmission housing 70. A stationary coil is advantageous because no slip rings or other measures are required to convey electrical power to the windings. The inner race is fixedly coupled to input shaft 11. Notice that left ring 54 is wider than right ring 52. The two rings may be circumferentially offset slightly such that the torque is reacted entirely or almost entirely through the left ring 54. In this way, the non-magnetic posts 62 do not need to transmit appreciable torque. Right ring 52 serves a magnetic function but does not carry significant mechanical load. Outer race 56 is fixedly coupled to gear 46 which is supported for rotation about input shaft 11. In alternative embodiments, the toothed rings may form an outer race and the pawls may be retained in an inner race. In that case, the coil would be located radially outside the outer race. The tooth profile would be on the radially inward surface of the outer race while a cylindrical surface of each ring faces outward adjacent to the coil. FIGS. 6 and 7 show the pawl in the disengaged and engaged positions respectively.

Friction clutches are capable of transmitting torque between elements that are rotating at different speeds. The transmitted torque tends to bring the components to the same speed. A pawl clutch, on the other hand, selectively couples elements by establishing a positive engagement as opposed to frictional engagement. As a result, a pawl clutch can only transmit torque between elements that are rotating at the same speed. Engaging a pawl clutch when the elements are at different speeds would produce a sudden change in speeds which is likely to be unpleasant to vehicle occupants and may even cause transmission components to fail. Therefore, control of element speeds at the time of clutch engagement is important.

When the vehicle is at low speed, the transmission of FIG. 1 is operated in the continuously variable mode. No current is supplied to coil 68 so clutch 50 is disengaged. When the controller determines that operation in the fixed ratio overdrive mode is preferable, the controller first transitions to a more overdrive speed ratio than the fixed ratio. Then, the controller commands current to coil 68 causing the pawls to pivot. The clutch does not engage immediately because gear 46 is rotating faster than shaft 11 in this condition. The controller, still controlling the speed ratio in the continuously variable mode, gradually permits the engine speed to increase. Once the fixed ratio is reached, clutch 50 will engage.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. An electro-magnetically actuated clutch comprising:
   a non-rotating electromagnet coil;
   a toothed inner race supported for rotation about the coil, the inner race having left and right magnetically conductive rings magnetically separated from one another;
   an outer race supported for rotation about the inner race; and
   a magnetically conductive pawl supported for rotation with the outer race and pivotable into engagement with the left and right rings in response to current in the coil.

2. The electro-magnetically actuated clutch of claim 1 wherein the left and right rings both have teeth.

3. The electro-magnetically actuated clutch of claim 2 wherein the teeth of a first of the left and right rings is offset from the teeth of a second of the left and right rings such that an engagement force is distributed disproportionately to the first of the left and right rings.

4. The electro-magnetically actuated clutch of claim 1 wherein the inner race has a tooth profile configured to prevent relative rotation between the inner and outer races in one direction in response to engagement of the pawl while permitting relative rotation in an opposite direction with the pawl engaged.

5. The electro-magnetically actuated clutch of claim 1 wherein the outer race is not magnetically conductive.

6. A clutch comprising:
   an electromagnetic coil;
   left and right magnetically conductive rings each having a cylindrical surface adjacent to the coil, at least one of the left and right rings having a toothed surface opposing the cylindrical surface, the left and right rings magnetically separated from each other;
   a race supported for rotation with respect to the rings; and
   a magnetically conductive pawl pivotable with respect to the race into engagement with at least one of the left and right rings in response to current in the coil.

7. The clutch of claim 6 wherein:
the electromagnetic coil is non-rotating; and
the left and right rings and the race are supported for rotation.

8. The clutch of claim 6 wherein:
the electromagnetic coil is radially inside the left and right rings; and
the race is radially outside the left and right rings.

9. The clutch if claim 6 wherein the left and right rings are fixedly coupled to one another.

10. The clutch of claim 6 wherein the left and right rings both have a toothed surface opposing the cylindrical surface.

11. The clutch of claim 10 wherein the teeth of a first of the left and right rings is offset from the teeth of a second of the left and right rings such that an engagement force is distributed disproportionately to the first of the left and right rings.

12. A transmission comprising:
an electromagnet coil fixed to a transmission case;
left and right magnetically conductive rings each fixedly coupled to an input shaft and magnetically separated from one another;
an outer race supported for rotation with respect to the input shaft; and
a magnetically conductive pawl supported for rotation with the outer race and pivotable into engagement with at least one of the left and right rings in response to current in the coil.

13. The transmission of claim 12 further comprising:
a planetary carrier fixedly coupled to the input shaft;
a plurality of planet gears supported for rotation with respect to the planet carrier;
a sun gear meshing with the planet gears and driveably connected to a generator; and
a ring gear meshing with the planet gears and driveably connected to a transmission output.

14. The transmission of claim 13 further comprising a motor driveably connected to the transmission output.

15. The transmission of claim 14 wherein the outer race is driveably connected to the transmission output.

* * * * *